United States Patent Office 2,975,699
Patented Mar. 21, 1961

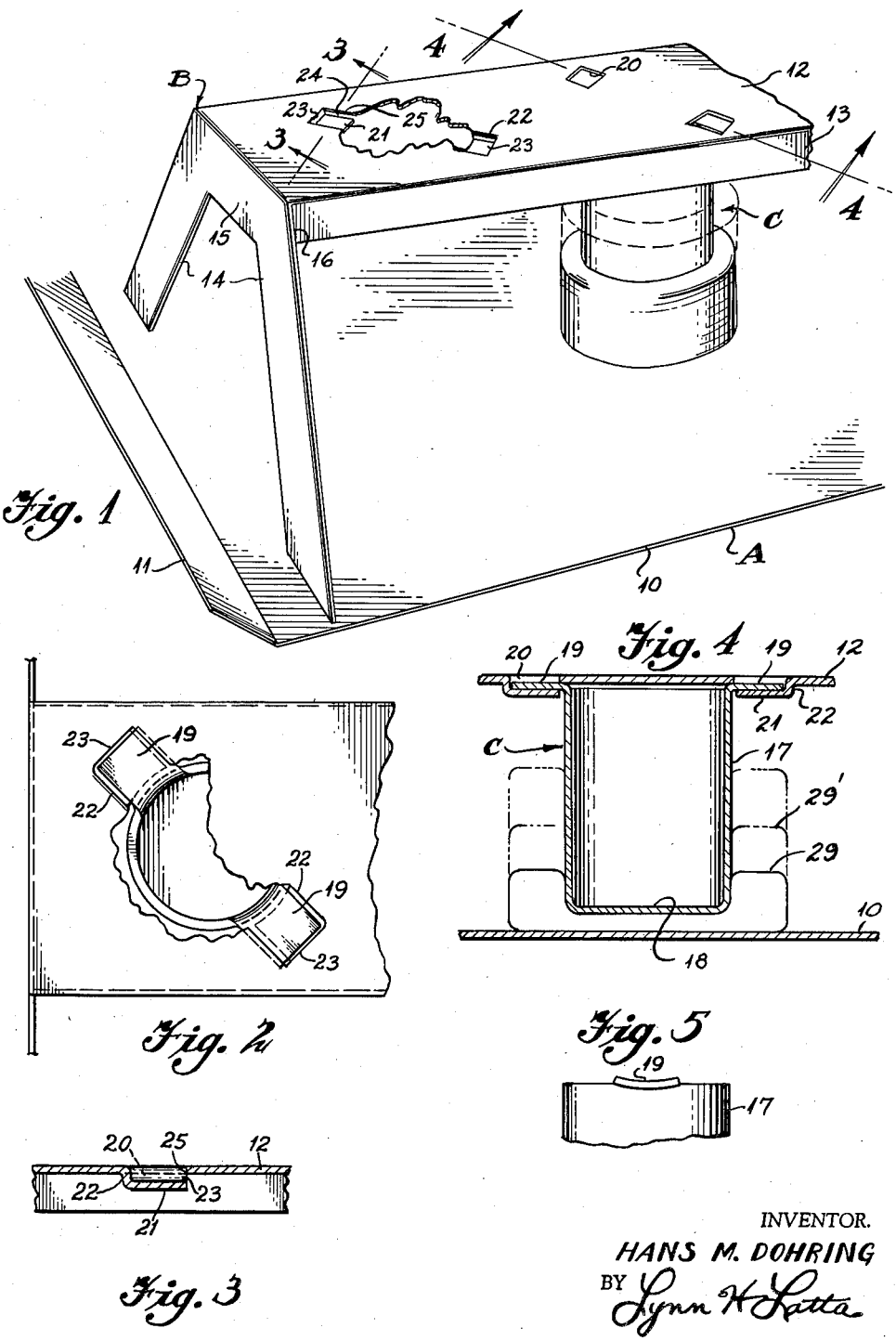

2,975,699

PATTY SHELL BAKING FORM

Hans M. Dohring, 716 Veteran Ave.,
Los Angeles 24, Calif.

Filed May 13, 1958, Ser. No. 734,870

4 Claims. (Cl. 99—442)

This invention relates to the baking of patty shells and has as its general object to provide an improved apparatus for imparting to a dough biscuit, during the baking thereof, the characteristic cup shape of a patty shell.

A specific object of the invention is to provide an apparatus for accurately forming a cavity of pre-determined size and shape within a patty shell during the baking thereof, without departing from the external appearance of a conventional patty shell.

The present method of fabricating a patty shell is to build several layers of dough, in the form of flat rings, upon a circular disc of dough having the same diameter as the external diameter of the rings, the several layers of dough becoming adhered to one another with the circular disc becoming the bottom of the shell, and rising during the baking process from a relatively shallow initial height to the full height of the patty shell. During this process, it is common for the superimposed rings of dough to contract irregularly within the cavity of the patty shell so as to leave a cavity in the finished patty shell which is of too irregular or constricted shape to be satisfactory. Also, the superimposed rings of dough may raise unevenly, tilting the patty shell to one side or the other, which likewise produces an unsatisfactory product. For many purposes it is quite desirable that the cavity be of regular shape and size, and the invention provides for attaining this result with certainty in all cases.

A further object of the invention is to provide an apparatus whereby a patty shell may be fabricated in a simplified and shortened process wherein a higher patty shell can be produced than in the use of conventional methods. In the use of the present invention it is possible to start with a single relatively thick ring of dough superimposed upon a bottom disc, and to attain a deeper cup shape in the patty shell as it rises around a core form which is the essential part of my apparatus.

A further object is to provide an apparatus for forming a patty shell during baking in a manner to prevent any lateral tilting or slumping of the patty shell while it is raising and preventing any contraction of the cavity during the raising and baking process.

Other objects and advantages will become apparent in the ensuing specification and appended drawing in which:

Fig. 1 is a fragmentary perspective view showing one end of an apparatus embodying my invention, with one of the core forming mandrels removed;

Fig. 2 is a plan view of the same;

Fig. 3 is a detail sectional view taken on the line 3—3 of Fig. 1;

Fig. 4 is a detail sectional view taken on the line 4—4 of Fig. 1; and

Fig. 5 is a fragmentary side view of the core-forming mandrel.

Referring now to the drawing in detail, I have shown therein, as an example of one form in which the invention may be embodied, a patty shell baking apparatus including, in general, a baking pallet A, a mandrel supporting stand B, and a series of core-forming mandrels C.

The pallet A may be a standard bun pan, or a plain rectangular cookie sheet 10 of metal (e.g. sheet aluminum) with suitable handle flanges 11 at its respective ends.

The stand B comprises a supporting beam 12 which may be of inverted channel section, with lateral longitudinal flanges 13 reinforcing the same for rigidly maintaining the beam in a flat, straight plane; together with pairs of legs 14 at the respective ends thereof for supporting the beam 12 at a proper height above the baking surface of the pallet 10 or any other heated baking surface that may be utilized. As an example of a relatively inexpensive and simple construction that may be used, the support B is illustrated as being formed from a single sheet of metal, with the legs 14 joined at their upper ends to respective integral end flanges 15 bent downwardly from respective ends of the channel 12 and braced by soldered or welded seams 16 between the outer margins of respective legs 14 and adjoining ends of respective flanges 13. Other equivalent constructions can be utilized.

Each of the forming mandrels C is in the form of a cylindrical cup including a cylindrical lateral wall portion 17, a flat bottom 18, and a pair of lugs 19 formed integrally with the rim of lateral wall 17 and bent outwardly in a common flat radial plane. The web of beam 12 is provided with a series of pairs of spaced seats 21 which are struck out of the web to define sockets 20 and are depressed below the lower face of the web of beam 12 sufficiently so that the mandrel lugs 19 are snugly receivable between the seats 21 and said lower face. The open upper ends of mandrels 17 are covered by the web 12 of the stand B to prevent the entry of dust into the mandrels, thus maintaining the apparatus more sanitary. Seats 21 are integrally joined to the web of channel 12 by offset webs 22 and 23 at the outer end and at one side of each respective seat 21. The opposite side of each seat 21 is separated from the web of channel 12 to provide a horizontal entry slot 24 extending the full radial length of the respective seat, the edge of the seat at that side being disposed directly below a radial edge 25 of the channel web, from which radial edge the free edge of the seat 21 has been sheared in the process of forming the channel 12. The slots 24 provide for insertion of the lugs 19 into the rectangular sockets 20 defined above the seats 21 between the edges 25 and the shoulders 23 and 22. Such insertion of the lugs is accomplished by raising a mandrel upwardly beneath the beam 12 in coaxial relation to a socket 20, with the lugs 19 displaced circumferentially from the seats 21, bringing the lugs 19 into contact with the underface of the beam 12 and then rotating the mandrel to cause the lugs to pass through the slots 24 and be received in the respective sockets and supported upon seats 21. The rotation of the mandrel is stopped by engagement of the lugs against the radial shoulders 22 opposite the slots 24 as indicated in Fig. 2. The lugs 19 are somewhat wider than the sockets 20, so that the sides of the lugs opposite the sides in engagement with shoulders 22 will remain engaged beneath beam 12 as indicated by the dotted lines in Fig. 2. Thus the lugs are locked to the beam 12 with the mandrels C restrained against rising under the pressure of the rising dough of the patty shells. At the same time, the supporting of the lugs 19 upon the seats 21 effects the suspending support of the mandrels from the beam 12 with the bottoms 18 at a pre-determined correct height above the baking surface of the pallet A as determined by the resting of the legs 14 on the latter.

A spring locking effect, for holding the mandrels against reverse rotation, is provided for by a circumferentially bowed cross section in the lugs 19 as illustrated in Fig. 5, the lateral sides of the lugs being inclined upwardly as shown. The upward inclination of the leading edge of each lug 19 facilitates entry through the respective slot 24. The upward inclination of the trailing edge of the respective lug provides for upward pressure engagement thereof against the underside of the beam 12 adjacent free edge 25 thereof as the lug reaches its home position above seat 21. That is to say, the downward depression of the central part of the lug establishes downward pressure against the seat 21 which in turn results in upward pressure at the trailing edge of the lug against the beam adjacent free edge 25, and this provides a spring locking effect. Any tendency of the mandrel to tilt from its true vertical axis as the result of the spring pressure thus applied at one lug is counteracted by the oppositely acting spring pressure at the other side of the mandrel.

Operation

In the use of the apparatus, the pallet A is placed on a hot stove, circular biscuits of dough are positioned on the pallet A, and the stand B, with mandrels C attached, is placed upon the pallet A with the lower ends of the mandrels 17 registering with the respective dough biscuits, in concentric relation thereto.

Since a plain flat baking surface is utilized, the dough biscuits may be located by trial and error fitting of the mandrels over the biscuits, and by correcting for any indicated error.

Fig. 4 illustrates the outline of a dough biscuit at 29, the rim thereof being shown in a slightly raised condition as the result of the indenting of the central part by the bottom of a mandrel C. As heat is tranmitted to the bottom of biscuit 29, it will gradually raise to acquire the characteristic patty shell cup shape indicated at 29' in Fig. 4. During such raising, the outer surface of the patty shell may assume the slightly irregular surface texture characteristic of a patty shell, there being no restraint against the expansion of the periphery of the patty shell. Furthermore, the unrestrained expansion provides for complete raising of the dough so as to attain the desired light feathery internal texture that is a desideratum in a patty shell.

When the baking is completed, the stand B is raised, with the patty shells adhering thereto, and is inverted. The patty shells may then be allowed to cool and harden and subsequently may be easily lifted off the respective mandrels.

The mandrels are then removed from the stand B for washing and the various parts of the apparatus are cleansed preparatory for subsequent use.

One of the advantages of the apparatus is in enabling a less experienced operator to produce a more uniform product. Another advantage is the reduction in production time which is effected by the apparatus, since the dough does not require the resting periods during the dough rolling procedure which is conventionally utilized for providing a more solid, stable laminated dough structure for the purpose of avoiding the lateral tilting etc. during the baking and raising process. Since lateral tilting is positively restrained in my apparatus, this problem is avoided by the apparatus. Such resting periods are also utilized in the conventionl process to prevent unwanted shrinkage in the biscuit. A further advantage of the apparatus is in the prevention of a partial raising of the bottom in the center thereof, which usually occurs in the normal procedure. Such raised center has to be removed before using the patty shell made by the conventional method.

Another advantage of the apparatus is in the uniformity of appearance in the finished patty shell which is assured by the use of the apparatus. A further advantage is in the prevention of loss which occurs in the conventional processing, which adds appeal to the finished product.

Also, the invention prevents loss through rejection of unsatisfactory patty shells made by conventional manufacture, having such imperfections as collapsed walls, tilted form, irregular diameters, and rings displaced laterally with reference to one another during the baking process.

The invention further has the advantage of providing for the attachment of mandrels of different diameters to the same stand B, the only difference between the various size mandrels being in the extent of projection of the lugs 19 from the peripheral wall of the mandrel, such projection being larger in the case of the smaller mandrels, and vice versa.

I claim:

1. In a patty shell baking form apparatus: a stand including a horizontal beam embodying an elongated web of flat sheet metal, a pair of legs secured to each end of said beam and extending downwardly in laterally spaced positions, and a plurality of groups of integral mandrel supporting seats in said web, the seats of each group being uniformly spaced radially and circumferentially with reference to a common vertical axis and said axes being longitudinally spaced along said beam, each of said seats being depressed below the plane of said web to define a lug-receiving socket, being integrally joined to said web along an outer end and one side of the respective socket by vertically offset shoulders, and being separated from said web along its opposite side to define an entry slot; a plurality of mandrels of cup form each including a cylindrical lateral wall having a rim defining an open top, and a flat bottom wall cooperating with said lateral wall to form a recess in a patty shell, and a plurality of thin flat lugs formed integrally with and projecting radially outwardly from said rim substantially in the plane thereof and receivable through respective entry slots and into respective sockets, with lateral margins of said lugs vertically retained between the opposed marginal portions of said web and seats along said entry slots to lock said mandrels to said beam; and a baking pallet for supporting dough biscuits below respective mandrels, said stand legs resting on said pallet at opposite ends thereof and supporting said stand so that the mandrels project downwardly from said beam with their said flat bottoms spaced above the upper surface of said pallet by a narrow flat horizontal space proportioned to correspond to the bottom of a patty shell, said baking pallet providing a flat baking surface with laterally unobstructed space around each mandrel adjacent said baking surface whereby patty shell dough biscuits arranged on said pallet with their upper ends receiving the lower ends of respective mandrels, will have free unrestrained raising and swelling upwardly and radially outwardly during a baking operation and at the same time will be guided by the mandrels so as to avoid tilting laterally while raising, and restrained from contracting inwardly so as to be internally shaped to the contours of the lower portions of said mandrels.

2. In a patty shell baking form apparatus: a stand including a horizontal beam embodying an elongated web of flat sheet metal, a pair of legs secured to each end of said beam and extending downwardly in laterally spaced positions, and a plurality of groups of integral mandrel supporting seats in said web, the seats of each group being uniformly spaced radially and circumferentially with reference to a common vertical axis and said axes being longitudinally spaced along said beam, each of said seats being depressed below the plane of said web to define a lug-receiving socket, being integrally joined to said web along an outer end and one side of the respective socket by vertically offset shoulders, and being separated from said web along its opposite side to define an entry slot; a plurality of mandrels of cup form each including a cylindrical lateral wall having a rim defining an open top, and a flat bottom wall cooperating with said lateral wall to form a recess in a patty shell, and a plurality of thin flat lugs formed integrally with and projecting radially outwardly from said rim substantially in the plane thereof and receivable through respective entry slots and into respective sockets, with the rims of said mandrels engaged beneath said beam web to lock said mandrels to said beam; and a baking pallet for supporting dough biscuits below respective mandrels, said stand legs resting on said pallet at opposite ends thereof and supporting said stand so that the mandrels project downwardly from said beam with their said flat bottoms spaced above the upper surface of said pallet by a narrow flat horizontal space proportioned to correspond to the bottom of a patty shell, said baking pallet providing a flat baking surface with laterally unobstructed space around each mandrel adjacent said baking surface whereby patty shell dough biscuits arranged on said pallet with their upper ends receiving the lower ends of respective mandrels, will have free unrestrained raising and swelling upwardly and radially outwardly during a baking operation and at the same time will be guided by the mandrel so as to avoid tilting laterally while raising, and restrained from contracting inwardly so as to be internally shaped to the contours of the lower portions of said mandrels.

3. In a patty shell baking form apparatus: a stand including a horizontal beam embodying an elongated web of flat sheet metal, a pair of legs secured to each end of said beam and extending downwardly in laterally spaced positions, and a group of integral mandrel supporting seats in said web, the seats being uniformly spaced radially and circumferentially with reference to a common vertical axis and each of said seats being depressed below the plane of said web to define a lug-receiving socket, being integrally joined to said web along an outer end and one side of the respective socket by vertically offset shoulders, and being separated from said web along its opposite side to define an entry slot; a mandrel of cup form including a cylindrical lateral wall having a rim defining an open top, and a flat bottom wall cooperating with said lateral wall to form a recess in a patty shell, and a plurality of thin flat lugs formed integrally with and projecting radially outwardly from said rim substantially in the plane thereof and receivable through respective entry slots and into respective sockets, with the rim of said mandrel engaged beneath said beam web to lock said mandrel to said beam; and a baking pallet for supporting dough biscuits below said mandrel, said stand legs resting on said pallet at opposite ends thereof and supporting said stand so that the mandrel projects downwardly from said beam with its said flat bottom spaced above the upper surface of said pallet by a narrow flat horizontal space proportioned to correspond to the bottom of a patty shell, said baking pallet providing a flat baking surface with laterally unobstructed space around said mandrel adjacent said baking surface whereby a patty shell dough biscuit arranged on said pallet with its upper end receiving the lower end of the mandrel, will have free unrestraining raising and swelling upwardly and radially outwardly during a baking operation and at the same time will be guided by the mandrel so as to avoid tilting laterally while raising, and restrained from contracting inwardly so as to be internally shaped to the contour of the lower portion of said mandrel.

4. Apparatus as defined in claim 3, wherein said beam is of shallow inverted channel section.

References Cited in the file of this patent
UNITED STATES PATENTS

| | | |
|---|---|---|
| 178,105 | Brown | May 30, 1876 |
| 492,803 | Hunter | Mar. 7, 1893 |
| 1,205,522 | Doerr et al. | Nov. 21, 1916 |
| 1,219,711 | Davoust | Mar. 20, 1917 |
| 1,510,279 | Huth et al. | Sept. 30, 1924 |
| 1,627,421 | Watkins | May 3, 1927 |
| 1,760,439 | Reid | May 27, 1930 |
| 1,831,147 | Smith | Nov. 10, 1931 |
| 2,167,038 | Damon | July 25, 1939 |
| 2,330,410 | Cyr | Sept. 28, 1943 |
| 2,621,616 | Ames | Dec. 16, 1952 |
| 2,626,773 | Backman | Jan. 27, 1953 |
| 2,774,316 | Daino | Dec. 18, 1956 |